US012810755B2

(12) United States Patent
Kuo et al.

(10) Patent No.: US 12,810,755 B2
(45) Date of Patent: Nov. 24, 2026

(54) PROJECTION DEVICE AND IMAGE PROCESSING MODULE WITH CONTRAST-BASED FLICKER REDUCTION

(71) Applicant: Coretronic Corporation, Hsin-Chu (TW)

(72) Inventors: Pen-Ning Kuo, Hsin-Chu (TW); Hai-Wei Wang, Hsin-Chu (TW); Te-Sung Su, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 124 days.

(21) Appl. No.: 18/896,939

(22) Filed: Sep. 26, 2024

(65) Prior Publication Data

US 2025/0148947 A1 May 8, 2025

(30) Foreign Application Priority Data

Nov. 8, 2023 (CN) ......................... 202311477367.8

(51) Int. Cl.
*G09G 3/00* (2006.01)
*G06T 5/20* (2006.01)
(Continued)

(52) U.S. Cl.
CPC ............... *G09G 3/007* (2013.01); *G06T 5/20* (2013.01); *G06T 5/73* (2024.01); *G06T 7/13* (2017.01); *H04N 9/3135* (2013.01); *H04N 9/3182* (2013.01); *H04N 9/3197* (2013.01); *G06T 2207/20192* (2013.01); *G09G 2320/0233* (2013.01); *G09G 2320/0247* (2013.01); *G09G 2320/0257* (2013.01); *G09G 2320/0626* (2013.01)

(58) Field of Classification Search
CPC ...................................................... G09G 3/007
See application file for complete search history.

(56) References Cited

U.S. PATENT DOCUMENTS

| | | | | |
|---|---|---|---|---|
| 10,009,587 | B1 | 6/2018 | Ma et al. | |
| 2009/0147031 | A1 * | 6/2009 | Miyazawa ............ | G03B 33/12 353/30 |

(Continued)

FOREIGN PATENT DOCUMENTS

| | | |
|---|---|---|
| CN | 1798247 | 7/2006 |
| CN | 113766114 | 12/2021 |
| WO | 2006094265 | 9/2006 |

OTHER PUBLICATIONS

Xiaodan Hu et al., "Content-Adaptive Non-Stationary Projector Resolution Enhancement", Master's thesis, University of WaterlooMaster of Applied Science, 2019, pp. 1-87.

*Primary Examiner* — Shivang I Patel
(74) *Attorney, Agent, or Firm* — JCIPRNET

(57) ABSTRACT

A projection device and an image processing module are provided. The image processing module is configured to receive an image signal. The image signal includes multiple sub-image signals. Each of the sub-image signals corresponds to multiple pixels. The pixels form a pixel shifting unit. The image processing module generates flicker data based on contrast in the pixel shifting unit, and generates an output image signal based on the flicker data and a first brightness signal corresponding to brightness of the image signal.

19 Claims, 7 Drawing Sheets

(51) Int. Cl.
*G06T 5/73* (2024.01)
*G06T 7/13* (2017.01)
*H04N 9/31* (2006.01)

(56) References Cited

U.S. PATENT DOCUMENTS

| | | | | |
|---|---|---|---|---|
| 2011/0141380 | A1* | 6/2011 | Ichimasa | H04N 9/3147<br>349/5 |
| 2017/0018232 | A1* | 1/2017 | Nicholson | H04N 5/57 |

* cited by examiner

PROJECTION DEVICE AND IMAGE PROCESSING MODULE WITH CONTRAST-BASED FLICKER REDUCTION

CROSS-REFERENCE TO RELATED APPLICATION

This application claims the priority benefit of China application serial no. 202311477367.8, filed on Nov. 8, 2023. The entirety of the above-mentioned patent application is hereby incorporated by reference herein and made a part of this specification.

BACKGROUND

Technical Field

The disclosure relates to a display device, and more particularly, to a projection device and an image processing module.

Description of Related Art

In the existing technology, resolution of a projector may be improved through the pixel shift technology. For example, resolution of an image projected by the projector may be improved by using an actuator to shift a pixel position of a projection beam. However, when a static image is displayed by such projection method, a user may easily experience flickering in high contrast and large image areas, resulting in a degradation of viewing quality.

The information disclosed in this Background section is only for enhancement of understanding of the background of the described technology and therefore it may contain information that does not form the prior art that is already known to a person of ordinary skill in the art. Further, the information disclosed in the Background section does not mean that one or more problems to be resolved by one or more embodiments of the disclosure was acknowledged by a person of ordinary skill in the art.

SUMMARY

A projection device in the disclosure includes an illumination module, a light valve module, a projection lens, and an image processing module. The illumination module is configured to provide an illumination beam. The light valve module is disposed on a transmission path of the illumination beam to convert the illumination beam into an image beam. The projection lens is disposed on a transmission path of the image beam to project the image beam out of the projection device. The image processing module is configured to receive an image signal. The image signal includes multiple sub-image signals. Each of the sub-image signals corresponds to multiple pixels. The multiple pixels form a pixel shifting unit. The image processing module generates flicker data based on contrast in the pixel shifting unit, and generates an output image signal based on the flicker data and a first brightness signal corresponding to brightness of the image signal. The light valve module converts the illumination beam into the image beam according to the output image signal.

An image processing module is further provided in the disclosure, configured to receive an image signal. The image processing module includes a flicker detector, an image blurring adjuster, and a blending module. The flicker detector generates flicker data based on contrast in multiple pixel shifting units. The image signal includes multiple sub-image signals. Each of the sub-image signals corresponds to multiple pixels. The multiple pixels form the pixel shifting unit. The image blurring adjuster performs low-pass filtering on a first brightness signal to generate a first blurring signal. The first brightness signal corresponds to brightness of the image signal. The blending module is coupled to the flicker detector and the image blurring adjuster. The blending module determines a weight of the first blurring signal and a weight of the first brightness signal based on the flicker data. The blending module generates a second blurring signal based on the first blurring signal and the weight of the first blurring signal, and generates a second brightness signal based on the first brightness signal and the weight of the first brightness signal. The blending module generates an output brightness signal based on the second blurring signal and the second brightness signal. The output brightness signal is related to the output image signal.

Other objectives, features and advantages of the present disclosure will be further understood from the further technological features disclosed by the embodiments of the present disclosure wherein there are shown and described preferred embodiments of this disclosure, simply by way of illustration of modes best suited to carry out the disclosure.

DETAILED DESCRIPTION OF DISCLOSED EMBODIMENTS

It is to be understood that other embodiment may be utilized and structural changes may be made without departing from the scope of the present disclosure. Also, it is to be understood that the phraseology and terminology used herein are for the purpose of description and should not be regarded as limiting. The use of “including,” “comprising,” or “having” and variations thereof herein is meant to encompass the items listed thereafter and equivalents thereof as well as additional items. Unless limited otherwise, the terms “connected,” “coupled,” and “mounted,” and variations thereof herein are used broadly and encompass direct and indirect connections, couplings, and mountings.

The disclosure provides a projection device and an image processing module, which may effectively reduce a situation in which a user experience image flickering when the projection device displays a static image, thereby greatly improving viewing quality. Other objects and advantages of the disclosure may be further understood from the technical features disclosed herein.

Figure 1:
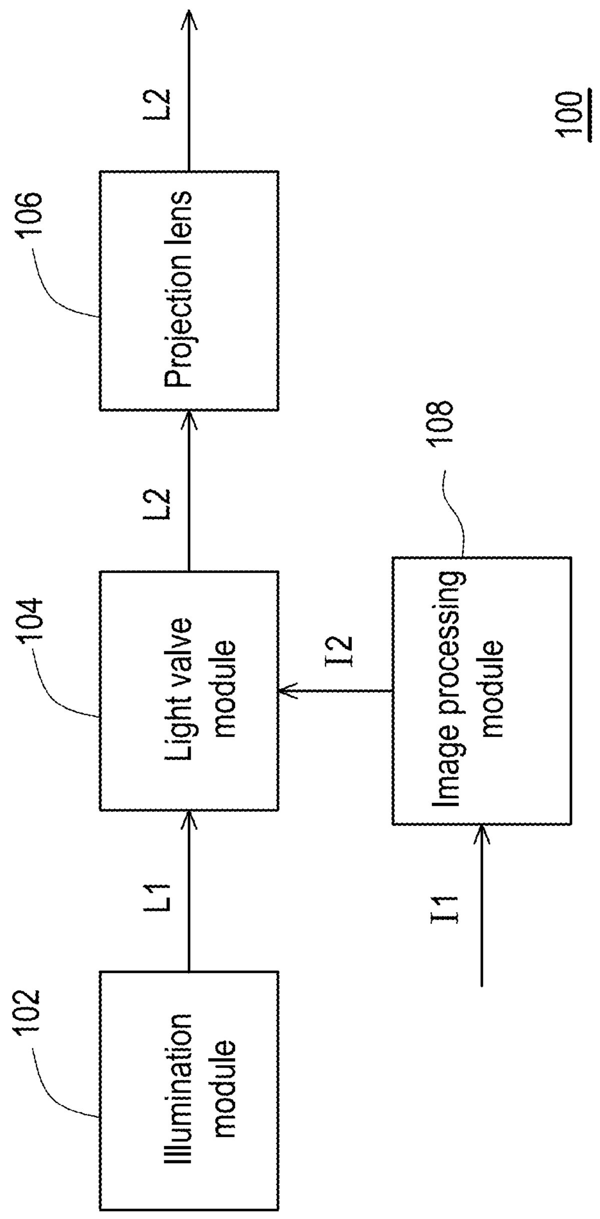
FIG. 1 is a schematic view of a projection device according to an embodiment of the disclosure.
Figure 2:
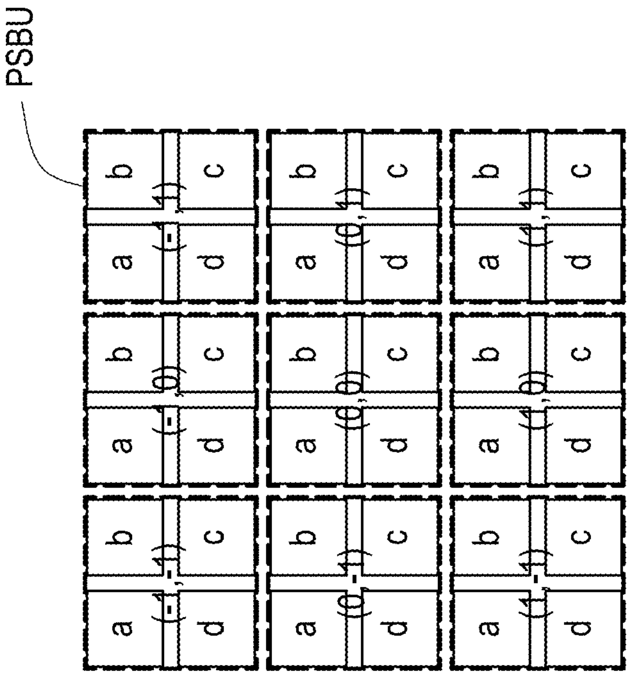
FIG. 2 is a schematic view of a pixel shifting unit according to an embodiment of the disclosure.

FIG. 1 is a schematic view of a projection device according to an embodiment of the disclosure. A projection device 100 may include an illumination module 102, a light valve module 104, a projection lens 106, and an image processing module 108. The illumination module 102 is configured to provide an illumination beam L1. The light valve module 104 is disposed on a transmission path of the illumination beam L1 from the illumination module 102 to convert the illumination beam L1 into an image beam L2. The light valve module 104 may be implemented by, for example, an optical actuator combined with a digital micro-mirror device (DMD) or an optical actuator combined with a liquid crystal panel (LCD), but the disclosure is not limited thereto. The projection lens 106 is disposed on a transmission path of the image beam L2 to project the image beam L2 out of the projection device 100. The image processing module 108 may receive an image signal I1. The image signal I1 includes multiple sub-image signals. Each of the sub-image signals corresponds to multiple pixels, and the multiple pixels form a pixel shifting unit. Taking the sub-image signals shown in FIG. 2 as an example, each of the sub-image signals includes four pixels a, b, c, and d, and the pixels a, b, c, and d form a pixel shifting unit PSBU. The pixel shifting unit PSBU is a smallest unit moved when the pixel shift technology is performed. The image processing module 108 may generate flicker data based on contrast of the pixel shifting unit PSBU, and generate an output image signal 12 based on the flicker data and a first brightness signal corresponding to brightness of the image signal I1. The light valve module 104 may convert the illumination beam L1 into the image beam L2 based on the output image signal 12. For example, the light valve module 104 may, for example, control the digital micro-mirror device in the light valve module 104 to convert the illumination beam L1 into the image beam L2 based on information included in the output image signal 12, and control the optical actuator to change a projection position and an orientation of the image beam L2 to achieve a purpose of improving resolution of a projection device through pixel shifting. It should be noted that the image signal I1 received by the image processing module 108 is not limited to and may be a dynamic image signal or a static image signal. The static image signal refers to an image signal in which the image processing module 108 continues to receive the same frame within a period of time. When the image signal I1 received by the image processing module 108 is a static image signal, the flicker data is generated based on the contrast in the pixel shifting unit PSBU, and the output image signal 12 is generated based on the flicker data and the first brightness signal corresponding to the brightness of the image signal I1, which may effectively reduce the situation where the user experience the image flickering when the projection device displays the static image, thereby greatly improving the viewing quality.

Figure 3:
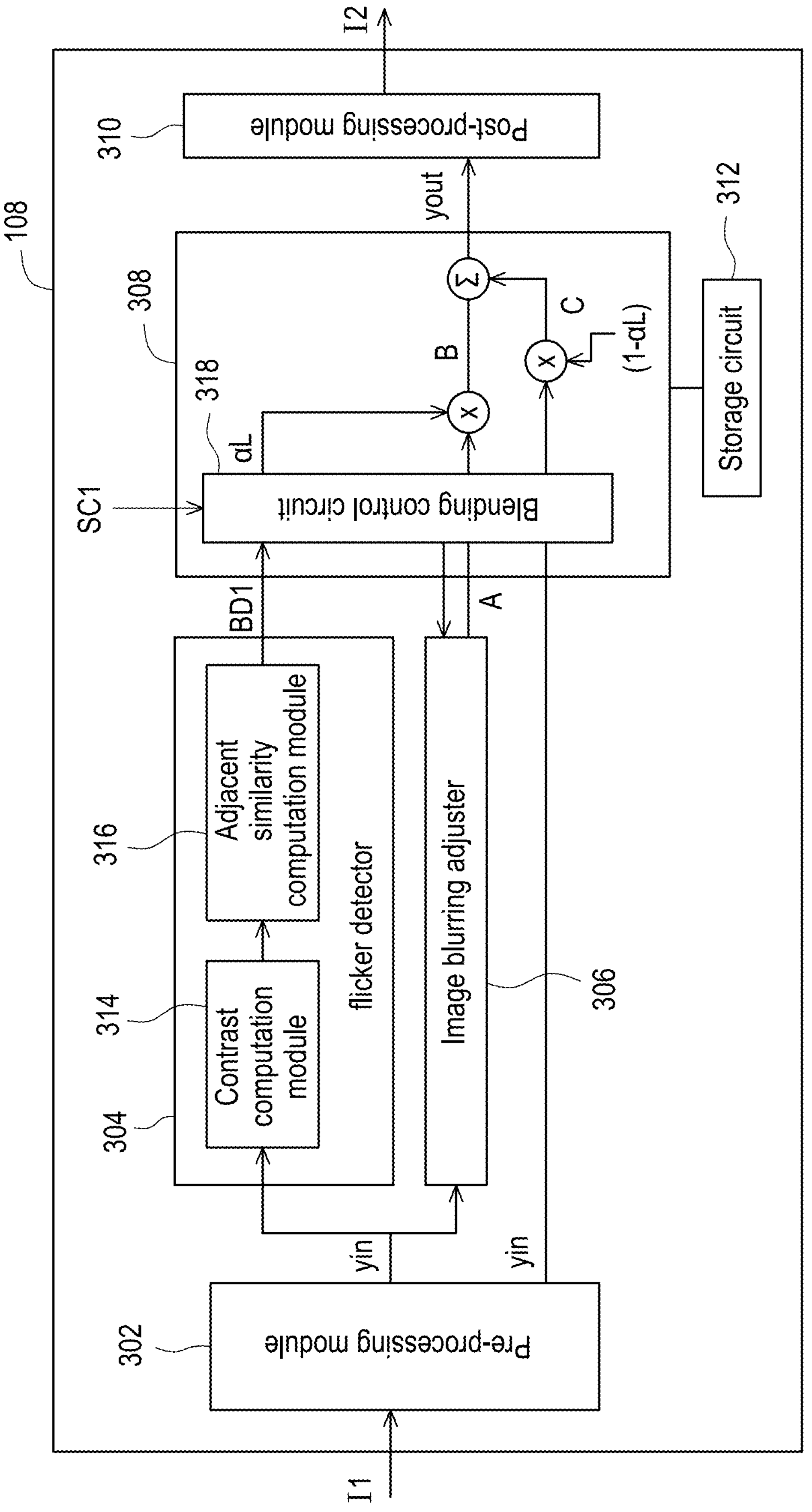
FIG. 3 is a schematic view of an image processing module according to an embodiment of the disclosure.

Furthermore, the image processing module 108 may be implemented by, for example, a field programmable gate array (FPGA), which may, as shown in FIG. 3, includes a pre-processing module 302, a flicker detector 304, an image blurring adjuster 306, a blending module 308, a post-processing module 310, and a storage circuit 312. The blending module 308 is coupled to the flicker detector 304 and the image blurring adjuster 306. The pre-processing module 302 is coupled to the flicker detector 304 and the image blurring adjuster 306. The blending module 308 is coupled to the pre-processing module 302 and the storage circuit 312. The post-processing module 310 is coupled to the blending module 308 and the light valve module 104 (not shown in FIG. 3).

The pre-processing module 302 may extract a first brightness signal yin of each of the pixels from the image signal I1, and the first brightness signal yin corresponds to the brightness of the image signal I1. For example, the pre-processing module 302 may convert the image signal I1 from an RGB color space signal into a signal in HSL, HSV, YUV, YCrCb, or other color spaces. In this embodiment, the pre-processing module 302 converts the image signal I1 into the YCrCb color space, and extract brightness Y in the YCrCb color space as the first brightness signal yin to provide to the flicker detector 304. In other embodiments, the pre-processing module 302 may also convert the image signal I1 into the signal in the HSL, HSV, or YUV color space, and extract brightness L or brightness V as the first brightness signal yin, which is not limited to this embodiment. The flicker detector 304 may generate flicker data BD1 based on the contrast in the pixel shifting unit PSBU corresponding to the first brightness signal yin.

Furthermore, the flicker detector 304 may include a contrast computation module 314 and an adjacent similarity computation module 316. The contrast computation module 314 may generate a flicker factor corresponding to each of the sub-image signals based on a brightness difference between the multiple pixels in each of the pixel shifting units. Taking FIG. 2 as an example, the contrast computation module 314 may calculate a flicker factor of each of the pixel shifting units PSBU (the sub-image signals) based on brightness values of the pixels a, b, c, and d in each of the pixel shifting units PSBU. For example, a first brightness difference value may be obtained by subtracting the brightness value of the pixel a from the brightness value of the pixel b. A second brightness difference value may be obtained by subtracting the brightness value of the pixel b from the brightness value of the pixel c. A third brightness difference value may be obtained by subtracting the brightness value of the pixel c from the brightness value of the pixel d. A fourth brightness difference value may be obtained by subtracting the brightness value of the pixel d from the brightness value of the pixel a. The four brightness difference values are compared with a first preset value and a second preset value respectively to obtain corresponding first to fourth flicker factors. In an embodiment, the first preset value is a positive value, and the second preset value is a negative value. Taking the first brightness difference value as an example, when the first brightness difference value is greater than or equal to the first preset value, the first flicker factor may be set to 1. When the first brightness difference value is between the first preset value and the second preset value, the first flicker factor may be set to 0. When the first brightness difference value is less than or equal to the first preset value, the first flicker factor may be set to −1. The second to fourth flicker factors may also be obtained in a similar way. Therefore, the same details will not be repeated in the following.

In addition, the adjacent similarity computation module 316 may generate the flicker data BD1 based on the flicker factors of each of the pixel shifting units and the adjacent pixel shifting units. Taking FIG. 2 as an example, the adjacent similarity computation module 316 may generate the flicker data BD1 based on the flicker factors of the pixel shifting unit PSBU located at coordinates (0,0) and the flicker factors of the eight adjacent pixel shifting units PSBU. In detail, the adjacent similarity computation module 316 may perform a sum-of-products computation on the 4 flicker factors of the pixel shifting unit PSBU located at the coordinates (0,0) and the 4 flicker factors of the pixel shifting unit PSBU located at coordinates (0,1). That is, the first flicker factor of the pixel shifting unit PSBU at the coordinates (0,0) is multiplied by the first flicker factor of the pixel shifting unit PSBU at the coordinates (0,1). The second flicker factor of the pixel shifting unit PSBU at the coordinates (0,0) is multiplied by the second flicker factor of the pixel shifting unit PSBU at the coordinates (0,1). The third flicker factor of the pixel shifting unit PSBU at the coordinates (0,0) is multiplied by the third flicker factor of the pixel shifting unit PSBU at the coordinates (0,1). The fourth flicker factor of the pixel shifting unit PSBU at the coordinates (0,0) is multiplied by the fourth flicker factor of the pixel shifting unit PSBU at the coordinates (0,1). A sum of the flicker factors obtained by adding the four products is compared with a preset sum. If the sum of the flicker factors is greater than the preset sum, it indicates that the pixel shifting unit PSBU located at the coordinates (0,0) is similar to the pixel shifting unit PSBU located at the coordinates (0,1) and has high contrast. Similarly, the adjacent similarity computation module 316 may determine whether the pixel shifting unit PSBU at the coordinates (0,0) and the adjacent pixel shifting units PSBU thereof (i.e., the pixel shifting units PSBU located at coordinates (−1,−1), (−1,0), (−1,1), (1,1), (1,0), (1,−1), (0,−1)) are similar in the same way, and generate the flicker data BD1 based on the number of similarities. The flicker data BD1 may indicate probability of high contrast and large-area flicker in the image after projection imaging. The greater the number of similarities between the pixel shifting unit PSBU at the coordinates (0,0) and the surrounding pixel shifting units PSBU, the higher the probability indicated by the flicker data BD1 in which an area where the pixel shifting unit PSBU at the coordinates (0,0) is located will have high contrast and large-area flicker in the image after projection imaging. Accordingly, the flicker data BD1 corresponding to each of the pixel shifting units PSBU may be calculated.

In addition, the image blurring adjuster 306 may perform low-pass filtering on the first brightness signal yin to generate a first blurring signal A. The blending module 308 may determine a weight αL of the first blurring signal A and a weight (1−αL) of the first brightness signal yin based on the flicker data BD1. When the probability of the flicker data BD1 indicating occurrence of high contrast and large-area flicker is higher, a blending control circuit 318 in the blending module 308 may correspondingly increase the weight αL of the first blurring signal A. The blending module 308 generates a second blurring signal B based on the first blurring signal A and the weight αL of the first blurring signal A, and generates a second brightness signal C based on the first brightness signal yin and the weight (1−αL) of the first brightness signal yin. That is, the first blurring signal A is multiplied by the weight αL of the first blurring signal A to generate the second blurring signal B, and the first brightness signal yin is multiplied by the weight (1−αL) of the first brightness signal yin to generate the second brightness signal C. Then, the blending module 308 generates an output brightness signal yout based on the second blurring signal B and the second brightness signal C. For example, the second blurring signal B and the second brightness signal C may be added to generate the output brightness signal yout. The output brightness signal yout is related to the output image signal 12. Furthermore, the post-processing module 310 may convert the converted color space signal back to the RGB color space signal. In this embodiment, the post-processing module 310 may perform color space conversion based on the output brightness signal yout and color difference signals Cr and Cb to generate the output image signal 12 in an RGB color space.

In addition, the storage circuit 312 may store multiple blurring adjustment coefficients. The blending control circuit 318 of the blending module 308 may select one of the corresponding blurring adjustment coefficients from the storage circuit 312 according to an adjustment control signal SC1 to be output to the image blurring adjuster 306 to determine a blurring degree of the image blurring adjuster 306. The adjustment control signal SC1 may be, for example, a blending gain setting signal. In some embodiments, the adjustment control signal SC1 may also be the blurring adjustment coefficient. The blending control circuit 318 may directly adjust the blurring degree of the image blurring adjuster 306 according to the adjustment control signal SC1. The adjustment control signal SC1 may be set through an on screen display (OSD), for example, and provided to the blending control circuit 318 from the outside. In addition, in other embodiments, the storage circuit 312 may also be disposed outside the image processing module 108, but is not limited to being disposed inside the image processing module 108 in this embodiment.

Figure 4:
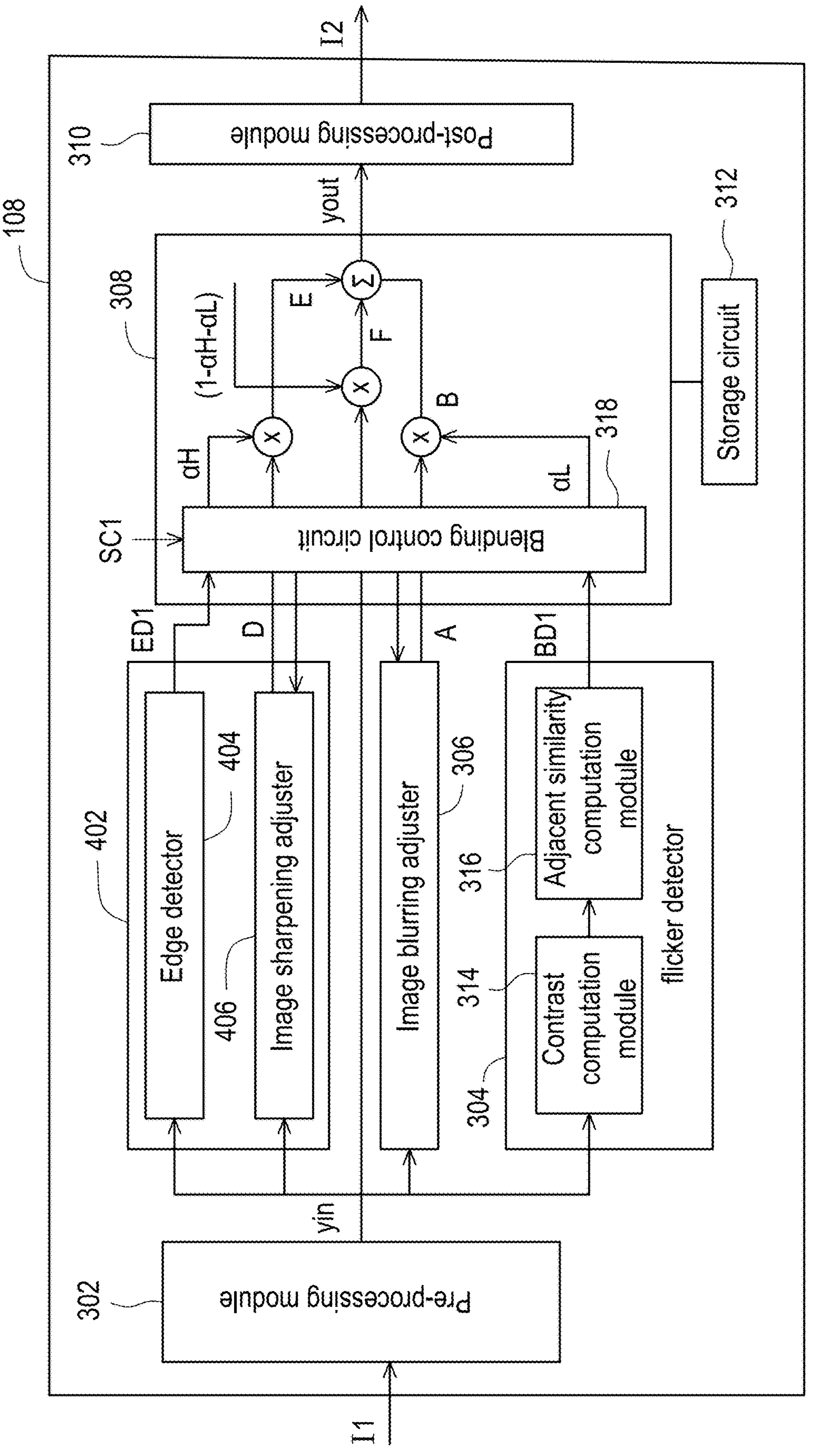
FIG. 4 is a schematic view of an image processing module according to another embodiment of the disclosure.

FIG. 4 is a schematic view of an image processing module according to another embodiment of the disclosure. In this embodiment, the image processing module 108 may further include an image sharpening module 402, and the image sharpening module 402 is coupled to the blending module 308. The image sharpening module 402 includes an edge detector 404 and an image sharpening adjuster 406. The edge detector 404 and the image sharpening adjuster 406 are coupled to the pre-processing module 302, and the edge detector 404 and the image sharpening adjuster 406 are coupled to the blending module 308. The edge detector 404 may perform image edge detection on the first brightness signal yin to generate an edge detection signal ED1. The image sharpening adjuster 406 may perform high-pass filtering on the first brightness signal yin to generate a first sharpening signal D. In this embodiment, the blending module 308 may further determine a weight αH of the first sharpening signal D and the weight (1−αH−αL) of the first brightness signal yin based on the edge detection signal ED1, and generate a second sharpening signal E based on the first sharpening signal D and the weight αH of the first sharpening signal D, generate a second brightness signal F based on the first brightness signal yin and the weight (1−αH−αL) of the first brightness signal yin, and generate an output brightness signal yout based on the second blurring signal B, the second sharpening signal E, and the second brightness signal F. In detail, for example, the first blurring signal A may be multiplied by the weight αL of the first blurring signal A to generate the second blurring signal B. The first sharpening signal D may be multiplied by the weight αH of the first sharpening signal D to generate the second sharpening signal E. The first brightness signal yin may be multiplied by the weight (1−αH−αL) of the first brightness signal yin to generate the second brightness signal F. The second blurring signal B, the second sharpening signal E, and the second brightness signal F may be added to generate the output brightness signal yout.

Similarly, the storage circuit 312 in this embodiment is coupled to the blending module 308, and may store multiple sharpening adjustment coefficients. The blending module 308 may select one of the corresponding sharpening adjustment coefficients according to the adjustment control signal SC1 to be output to the image sharpening adjuster 406 to determine a sharpening degree of the image sharpening adjuster 406. The adjustment control signal SC1 may be, for example, a blending gain setting signal. In some embodiments, the adjustment control signal SC1 may also be the sharpening adjustment coefficient. The blending control circuit 318 may directly adjust the sharpening degree of the image sharpening adjuster 406 according to the adjustment control signal SC1.

In an embodiment, the blending control circuit 318 may determine the weight αL of the first blurring signal A and the weight αH of the first sharpening signal D according to the flicker data BD1. For example, when the blending control circuit 318 receives the flicker data BD1 corresponding to one pixel shifting unit PSBU, which indicates that after projection imaging, the probability of high contrast and large-area flicker in the image is greater than the preset value, the blending control circuit 318 adjusts the weight αL of the first blurring signal A to 1, and adjusts the weight αH of the first sharpening signal D to 0. At this time, the pixel shifting unit PSBU only performs image blurring processing and does not perform image sharpening processing. That is, the pixel shifting unit PSBU will give priority to performing image blurring processing. In addition, in other embodiments, relative proportions of the weight αL of the first blurring signal A and the weight αH of the first sharpening signal D may also be adjusted according to requirements.

Figure 5:
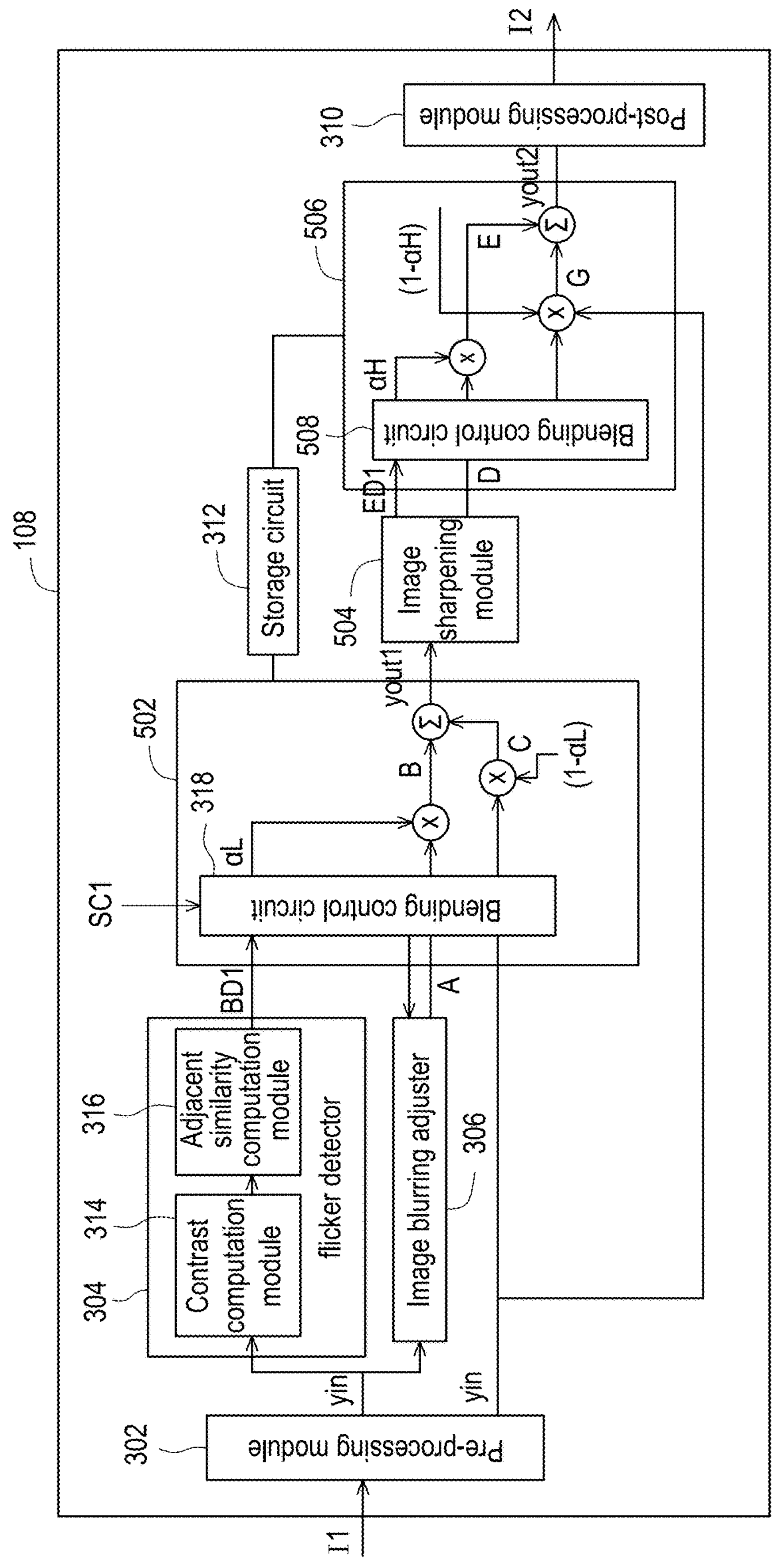
FIG. 5 is a schematic view of an image processing module according to another embodiment of the disclosure.

FIG. 5 is a schematic view of an image processing module according to another embodiment of the disclosure. In this embodiment, the blending module 308 may include a first blending circuit 502, an image sharpening module 504, and a second blending circuit 506. The first blending circuit 502 is coupled to the flicker detector 304, the image blurring adjuster 306, the storage circuit 312, and the image sharpening module 504. The second blending circuit 506 is coupled to the storage circuit 312, the image sharpening module 504, and the post-processing module 310. Implementation of the first blending circuit 502 in this embodiment is the same as that of the blending module 308 in FIG. 3. The first blending circuit 502 determines the weight αL of the first blurring signal A and the first weight (1−αL) of the first brightness signal yin according to the flicker data, generates the second blurring signal B according to the first blurring signal A and the weight αL of the first blurring signal A, and generates the second brightness signal C according to the first brightness signal yin and the first weight (1−αL) of the first brightness signal yin. The first blending circuit 502 adds the second blurring signal B and the second brightness signal C to generate a third brightness signal yout1.

A difference between this embodiment and the embodiment of FIG. 3 is that the image sharpening module 504 and the second blending circuit 506 are further included. Similar to the image sharpening module 402 in the embodiment of FIG. 4, the image sharpening module 504 in this embodiment may receive the third brightness signal yout1 provided by the first blending circuit 502 to perform high-pass filtering on the third brightness signal yout1 to generate the first sharpening signal D, and perform image edge detection on the third brightness signal yout1 to generate the edge detection signal ED1. The second blending circuit 506 may determine the weight αH of the first sharpening signal D and a second weight (1−αH) of the first brightness signal yin according to the edge detection signal ED1. The second blending circuit 506 may further generate the second sharpening signal E according to the first sharpening signal D and the weight αH of the first sharpening signal D, and generate a fourth brightness signal G according to the first brightness signal yin and the second weight (1−αH) of the first brightness signal yin. For example, the first sharpening signal D may be multiplied by the weight αH of the first sharpening signal D to generate the second sharpening signal E, and the first brightness signal yin may be multiplied by the second weight (1−αH) of the first brightness signal yin to generate the fourth brightness signal G. Then, the second blending circuit 506 adds the second sharpening signal E and the fourth brightness signal G to generate an output brightness signal yout2 to the post-processing module 310 for subsequent signal processing. The method in this embodiment may be applied to situations where image sharpness is required to be high.

Figure 6:
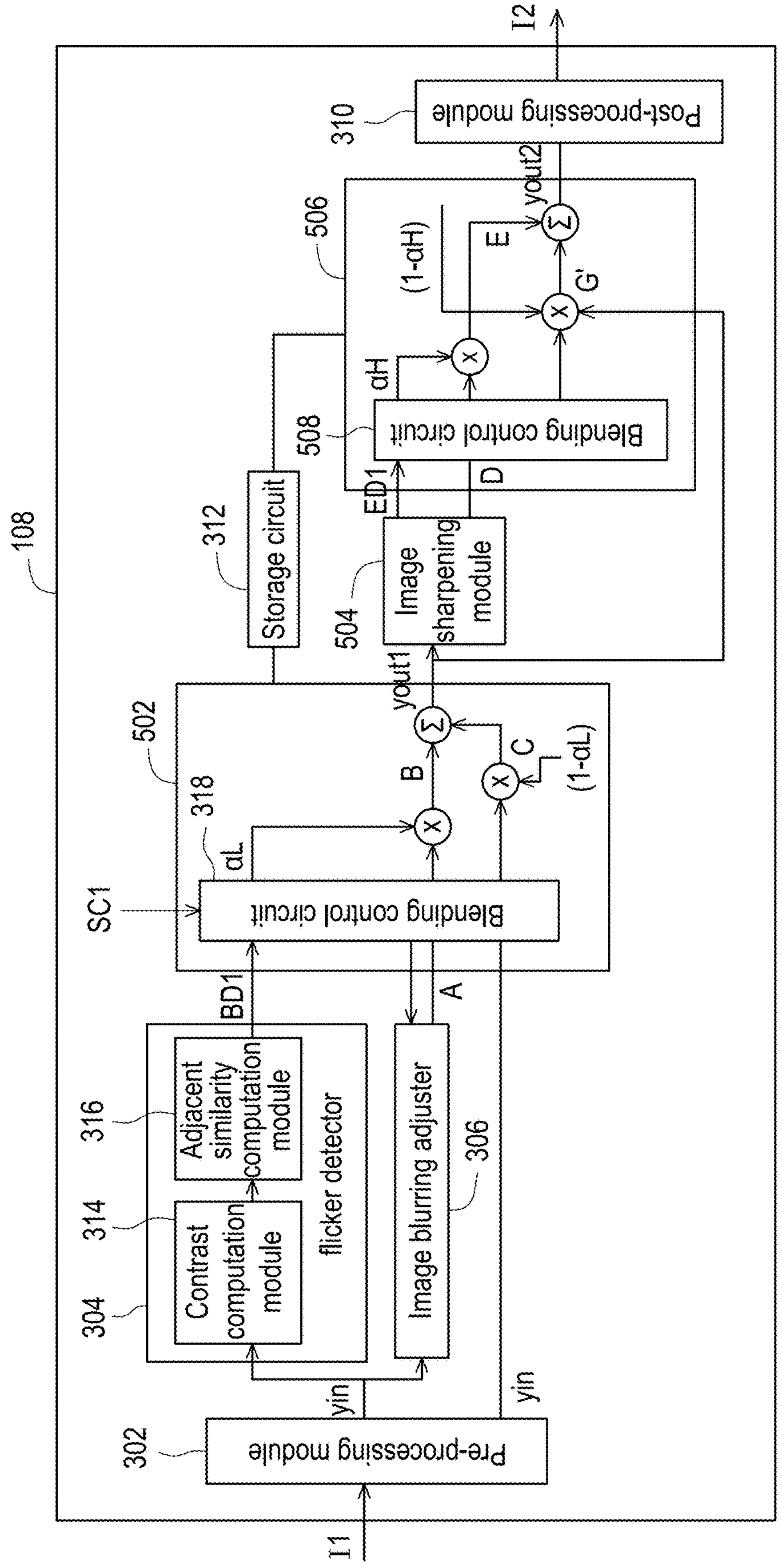
FIG. 6 is a schematic view of an image processing module according to another embodiment of the disclosure.

It is worth noting that in other embodiments, the second blending circuit 506 may also generate the output brightness signal yout2 in other ways. For example, in the embodiment of FIG. 6, different from the embodiment of FIG. 5, the second blending circuit 506 may use the weight (1−αH) as a weight of the third brightness signal yout1. That is, the weight αH of the first sharpening signal D and the weight (1−αH) of the third brightness signal yout1 are determined based on the edge detection signal ED1. The third brightness signal yout1 is multiplied by the weight (1−αH) of the third brightness signal yout1 to generate a fifth brightness signal G', and the second sharpening signal E and the fifth brightness signal G' are added to generate the output brightness signal yout2 to the post-processing module 310 for subsequent signal processing. That is to say, in the embodiment of FIG. 5, the fourth brightness signal G is generated by using the first brightness signal yin and the second weight (1−αH) of the first brightness signal, and then the output brightness signal yout2 is calculated according to the fourth brightness signal G and the second sharpening signal E. In the embodiment of FIG. 6, the first brightness signal yin is not used directly, but the third brightness signal yout1 and the weight (1−αH) of the third brightness signal yout1 are used to generate the fifth brightness signal G', and then the output brightness signal yout2 is calculated according to the fifth brightness signal G' and the second sharpening signal E. The method in this embodiment is relatively simple in terms of hardware design.

Figure 7:
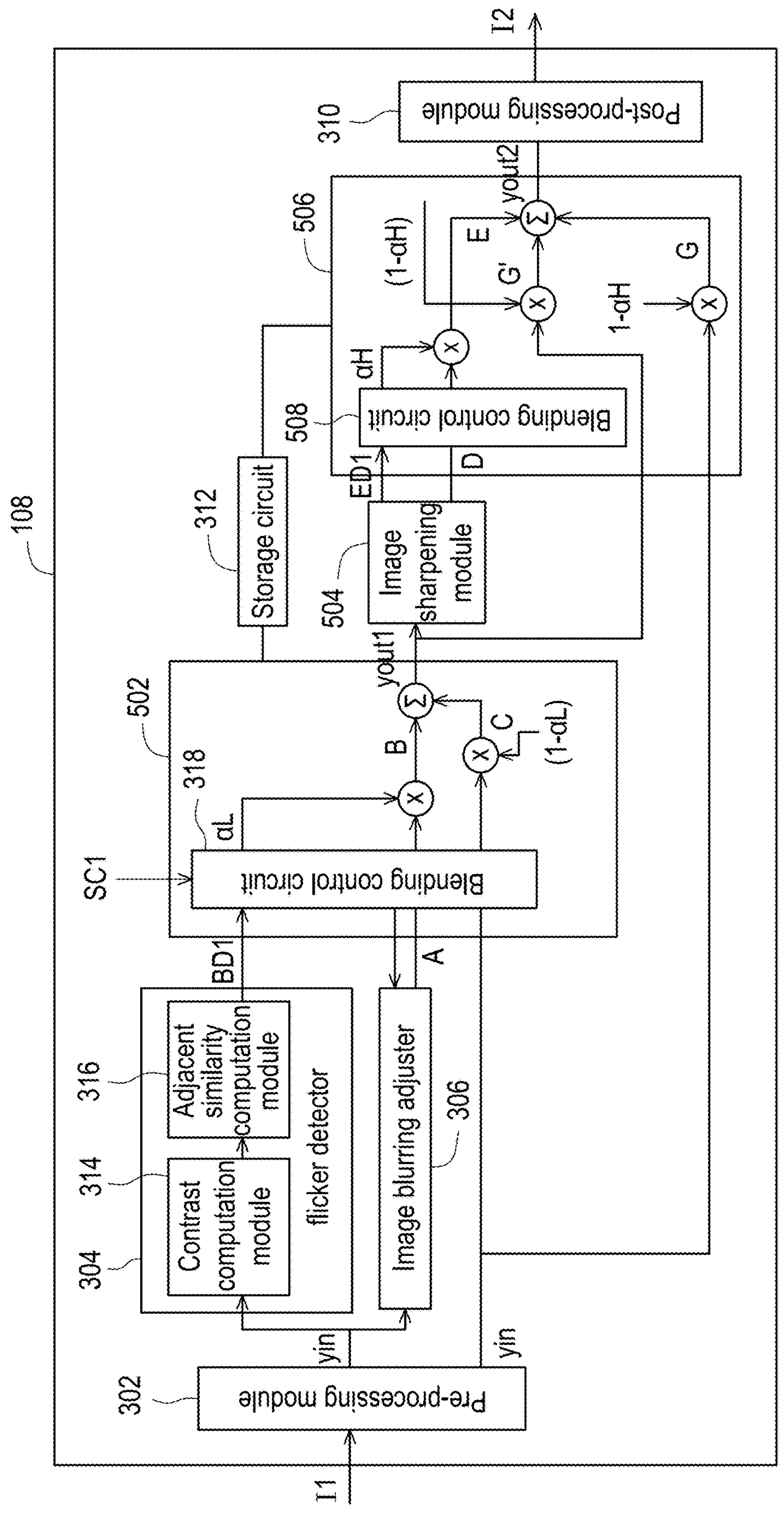
FIG. 7 is a schematic view of an image processing module according to another embodiment of the disclosure

For another example, in the embodiment of FIG. 7, the calculation of the output brightness signal yout2 may be performed in combination with the embodiments of FIGS. 5 and 6. In detail, the second blending circuit 506 may use the weight (1−αH) as the second weight of the first brightness signal yin and the weight of the third brightness signal yout1, multiply the first brightness signal yin by the second weight (1−αH) of the first brightness signal yin to generate the fourth brightness signal G, multiply the third brightness signal yout1 by the weight (1−αH) of the third brightness signal yout1 to generate the fifth brightness signal G', and add the second sharpening signal E, the fourth brightness signal G, and the fifth brightness signal G' to generate the output brightness signal yout2 to the post-processing module 310 for subsequent signal processing.

Based on the above, the image processing module in the disclosure may generate the flicker data based on the contrast in the pixel shifting unit, and generate the output image signal based on the flicker data and the first brightness signal corresponding to the brightness of the image signal. The pixel shifting unit is formed by the pixels of the sub-image signal. In this way, it may effectively reduce the situation in which the user experience image flickering when the projection device displays the static image, thereby greatly improving the viewing quality.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive.

Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. A projection device, comprising:

an illumination module configured to provide an illumination beam;

a light valve module disposed on a transmission path of the illumination beam to convert the illumination beam into an image beam;

a projection lens disposed on a transmission path of the image beam to project the image beam out of the projection device; and an image processing module configured to receive an image signal, wherein the image signal comprises a plurality of sub-image signals, each of the plurality of sub-image signals corresponds to a plurality of pixels, the plurality of pixels form a pixel shifting unit, the image processing module comprises a flicker detector to generate flicker data based on contrast in the pixel shifting unit, and generates an output image signal based on the flicker data and a first brightness signal corresponding to brightness of the image signal, and the light valve module converts the illumination beam into the image beam according to the output image signal, wherein the flicker detector further comprises a contrast computation module and an adjacent similarity computation module, wherein the contrast computation module generates a flicker factor corresponding to each of the plurality of sub-image signals based on a brightness difference between the plurality of pixels in each of the pixel shifting unit, and the adjacent similarity computation module generates the flicker data based on a plurality of flicker factors of each of the pixel shifting unit and the adjacent pixel shifting unit thereof.

2. The projection device according to claim 1, wherein the image processing module comprises:

an image blurring adjuster performing low-pass filtering on the first brightness signal to generate a first blurring signal; and a blending module coupled to the flicker detector and the image blurring adjuster, wherein the blending module determines a weight of the first blurring signal and a weight of the first brightness signal based on the flicker data, wherein the blending module generates a second blurring signal based on the first blurring signal and the weight of the first blurring signal, and generates a second brightness signal based on the first brightness signal and the weight of the first brightness signal, the blending module generates an output brightness signal based on the second blurring signal and the second brightness signal, and the output brightness signal is related to the output image signal.

3. The projection device according to claim 2, wherein the blending module adds the second blurring signal and the second brightness signal to generate the output brightness signal.

4. The projection device according to claim 2, wherein the image processing module further comprises:

a pre-processing module coupled to the flicker detector to extract the first brightness signal from the image signal, wherein the flicker detector generates the flicker data based on the contrast in the pixel shifting unit corresponding to the first brightness signal; and a post-processing module coupled to the blending module and generating the output image signal based on the output brightness signal.

5. The projection device according to claim 2, further comprising:

a storage circuit coupled to the blending module and storing a plurality of blurring adjustment coefficients, wherein the blending module selects one of the plurality of blurring adjustment coefficients according to an adjustment control signal to be output to the image blurring adjuster to determine a blurring degree of the image blurring adjuster.

6. The projection device according to claim 2, wherein the image processing module further comprises an image sharpening module, and the image sharpening module comprises:

an edge detector performing image edge detection on the first brightness signal to generate an edge detection signal; and an image sharpening adjuster performing high-pass filtering on the first brightness signal to generate a first sharpening signal, wherein the blending module is coupled to the image sharpening module, and the blending module further determines a weight of the first sharpening signal and the weight of the first brightness signal based on the edge detection signal, wherein the blending module generates a second sharpening signal based on the first sharpening signal and the weight of the first sharpening signal, and generates the second brightness signal based on the first brightness signal and the weight of the first brightness signal, the blending module generates the output brightness signal based on the second blurring signal, the second sharpening signal, and the second brightness signal.

7. The projection device according to claim 6, further comprising:

a storage circuit coupled to the blending module and storing a plurality of sharpening adjustment coefficients, wherein the blending module selects one of the plurality of sharpening adjustment coefficients according to an adjustment control signal to be output to the image sharpening adjuster to determine a sharpening degree of the image sharpening adjuster.

8. The projection device according to claim 2, wherein the blending module further comprises:

a first blending circuit coupled to the flicker detector and the image blurring adjuster, wherein the first blending circuit determines the weight of the first blurring signal and a first weight of the first brightness signal based on the flicker data, generates the second blurring signal based on the first blurring signal and the weight of the first blurring signal, and generates the second brightness signal based on the first brightness signal and the first weight of the first brightness signal, and the first blending circuit adds the second blurring signal and the second brightness signal to generate a third brightness signal;

an image sharpening module coupled to the first blending circuit, wherein the image sharpening module performs high-pass filtering on the third brightness signal to generate a first sharpening signal, and the image sharpening module further performs image edge detection on the third brightness signal to generate an edge detection signal; and a second blending circuit coupled to the image sharpening module, wherein the second blending circuit determines a weight of the first sharpening signal and a second weight of the first brightness signal based on the edge detection signal, the second blending circuit generates a second sharpening signal based on the first sharpening signal and the weight of the first sharpening signal, and generates a fourth brightness signal based on the first brightness signal and the second weight of the first brightness signal, and the second blending circuit adds the second sharpening signal and the fourth brightness signal to generate the output brightness signal.

9. The projection device according to claim 2, wherein the blending module further comprises:

a first blending circuit coupled to the flicker detector and the image blurring adjuster, wherein the first blending circuit determines the weight of the first blurring signal and the weight of the first brightness signal based on the flicker data, generates the second blurring signal based on the first blurring signal and the weight of the first blurring signal, and generates the second brightness signal based on the first brightness signal and the weight of the first brightness signal, and the first blending circuit adds the second blurring signal and the second brightness signal to generate a third brightness signal;

an image sharpening module coupled to the first blending circuit, wherein the image sharpening module performs high-pass filtering on the third brightness signal to generate a first sharpening signal, and the image sharpening module further performs image edge detection on the third brightness signal to generate an edge detection signal; and a second blending circuit coupled to the image sharpening module, wherein the second blending circuit determines a weight of the first sharpening signal and a weight of the third brightness signal based on the edge detection signal, the second blending circuit generates a second sharpening signal based on the first sharpening signal and the weight of the first sharpening signal, and generates a fifth brightness signal based on the third brightness signal and the weight of the third brightness signal, and the second blending circuit adds the second sharpening signal and the fifth brightness signal to generate the output brightness signal.

10. The projection device according to claim 2, wherein the blending module further comprises:

a first blending circuit coupled to the flicker detector and the image blurring adjuster, wherein the first blending circuit determines the weight of the first blurring signal and a first weight of the first brightness signal based on the flicker data, generates the second blurring signal based on the first blurring signal and the weight of the first blurring signal, and generates the second brightness signal based on the first brightness signal and the first weight of the first brightness signal, and the first blending circuit adds the second blurring signal and the second brightness signal to generate a third brightness signal;

an image sharpening module coupled to the first blending circuit, wherein the image sharpening module performs high-pass filtering on the third brightness signal to generate a first sharpening signal, and the image sharpening module further performs image edge detection on the third brightness signal to generate an edge detection signal; and a second blending circuit coupled to the image sharpening module, wherein the second blending circuit determines a weight of the first sharpening signal, a second weight of the first brightness signal, and a weight of the third brightness signal based on the edge detection signal, the second blending circuit generates a second sharpening signal based on the first sharpening signal and the weight of the first sharpening signal, generates a fourth brightness signal based on the first brightness signal and the second weight of the first brightness signal, and generates a fifth brightness signal based on the third brightness signal and the weight of the third brightness signal, and the second blending circuit adds the second sharpening signal, the fourth brightness signal, and the fifth brightness signal to generate the output brightness signal.

11. An image processing module configured to receive an image signal, comprising:

a flicker detector generating flicker data based on contrast in a plurality of pixel shifting units, wherein the image signal comprises a plurality of sub-image signals, each of the plurality of sub-image signals corresponds to a plurality of pixels, and the plurality of pixels form the pixel shifting unit;

an image blurring adjuster performing low-pass filtering on a first brightness signal to generate a first blurring signal, wherein the first brightness signal corresponds to brightness of the image signal; and a blending module coupled to the flicker detector and the image blurring adjuster, wherein the blending module determines a weight of the first blurring signal and a weight of the first brightness signal based on the flicker data, wherein the blending module generates a second blurring signal based on the first blurring signal and the weight of the first blurring signal, and generates a second brightness signal based on the first brightness signal and the weight of the first brightness signal, the blending module generates an output brightness signal based on the second blurring signal and the second brightness signal, and the output brightness signal is related to the output image signal, wherein the flicker detector further comprises a contrast computation module and an adjacent similarity computation module, wherein the contrast computation module generates a flicker factor corresponding to each of the plurality of sub-image signals based on a brightness difference between the plurality of pixels in each of the pixel shifting unit, and the adjacent similarity computation module generates the flicker data based on a plurality of flicker factors of each of the pixel shifting unit and the adjacent pixel shifting units thereof.

12. The image processing module according to claim 11, wherein the blending module adds the second blurring signal and the second brightness signal to generate the output brightness signal.

13. The image processing module according to claim 11, further comprising:

a pre-processing module coupled to the flicker detector to extract the first brightness signal from the image signal, wherein the flicker detector generates the flicker data based on the contrast in the pixel shifting unit corresponding to the first brightness signal; and a post-processing module coupled to the blending module and generating the output image signal based on the output brightness signal.

14. The image processing module according to claim 11, further comprising:

a storage circuit coupled to the blending module and storing a plurality of blurring adjustment coefficients, wherein the blending module selects one of the plurality of blurring adjustment coefficients according to an adjustment control signal to be output to the image blurring adjuster to determine a blurring degree of the image blurring adjuster.

15. The image processing module according to claim 11, wherein the image processing module further comprises an image sharpening module, and the image sharpening module comprises:

an edge detector performing image edge detection on the first brightness signal to generate an edge detection signal; and an image sharpening adjuster performing high-pass filtering on the first brightness signal to generate a first sharpening signal, wherein the blending module is coupled to the image sharpening module, and the blending module further determines a weight of the first sharpening signal and the weight of the first brightness signal based on the edge detection signal, wherein the blending module generates a second sharpening signal based on the first sharpening signal and the weight of the first sharpening signal, and generates the second brightness signal based on the first brightness signal and the weight of the first brightness signal, the blending module generates the output brightness signal based on the second blurring signal, the second sharpening signal, and the second brightness signal.

16. The image processing module according to claim 15, further comprising:

a storage circuit coupled to the blending module and storing a plurality of sharpening adjustment coefficients, wherein the blending module selects one of the plurality of sharpening adjustment coefficients according to an adjustment control signal to be output to the image sharpening adjuster to determine a sharpening degree of the image sharpening adjuster.

17. The image processing module according to claim 11, wherein the blending module further comprises:

a first blending circuit coupled to the flicker detector and the image blurring adjuster, wherein the first blending circuit determines the weight of the first blurring signal and a first weight of the first brightness signal based on the flicker data, generates the second blurring signal based on the first blurring signal and the weight of the first blurring signal, and generates the second brightness signal based on the first brightness signal and the first weight of the first brightness signal, and the first blending circuit adds the second blurring signal and the second brightness signal to generate a third brightness signal;

an image sharpening module coupled to the first blending circuit, wherein the image sharpening module performs high-pass filtering on the third brightness signal to generate a first sharpening signal, and the image sharpening module further performs image edge detection on the third brightness signal to generate an edge detection signal; and a second blending circuit coupled to the image sharpening module, wherein the second blending circuit determines a weight of the first sharpening signal and a second weight of the first brightness signal based on the edge detection signal, the second blending circuit generates a second sharpening signal based on the first sharpening signal and the weight of the first sharpening signal, and generates a fourth brightness signal based on the first brightness signal and the second weight of the first brightness signal, and the second blending circuit adds the second sharpening signal and the fourth brightness signal to generate the output brightness signal.

18. The image processing module according to claim 11, wherein the blending module further comprises:

a first blending circuit coupled to the flicker detector and the image blurring adjuster, wherein the first blending circuit determines the weight of the first blurring signal and the weight of the first brightness signal based on the flicker data, generates the second blurring signal based on the first blurring signal and the weight of the first blurring signal, and generates the second brightness signal based on the first brightness signal and the weight of the first brightness signal, and the first blending circuit adds the second blurring signal and the second brightness signal to generate a third brightness signal;

an image sharpening module coupled to the first blending circuit, wherein the image sharpening module performs high-pass filtering on the third brightness signal to generate a first sharpening signal, and the image sharpening module further performs image edge detection on the third brightness signal to generate an edge detection signal; and a second blending circuit coupled to the image sharpening module, wherein the second blending circuit determines a weight of the first sharpening signal and a weight of the third brightness signal based on the edge detection signal, the second blending circuit generates a second sharpening signal based on the first sharpening signal and the weight of the first sharpening signal, and generates a fifth brightness signal based on the third brightness signal and the weight of the third brightness signal, and the second blending circuit adds the second sharpening signal and the fifth brightness signal to generate the output brightness signal.

19. The image processing module according to claim 11, wherein the blending module further comprises:

a first blending circuit coupled to the flicker detector and the image blurring adjuster, wherein the first blending circuit determines the weight of the first blurring signal and a first weight of the first brightness signal based on the flicker data, generates the second blurring signal based on the first blurring signal and the weight of the first blurring signal, and generates the second brightness signal based on the first brightness signal and the first weight of the first brightness signal, and the first blending circuit adds the second blurring signal and the second brightness signal to generate a third brightness signal;

an image sharpening module coupled to the first blending circuit, wherein the image sharpening module performs high-pass filtering on the third brightness signal to generate a first sharpening signal, and the image sharpening module further performs image edge detection on the third brightness signal to generate an edge detection signal; and a second blending circuit coupled to the image sharpening module, wherein the second blending circuit determines a weight of the first sharpening signal, a second weight of the first brightness signal, and a weight of the third brightness signal based on the edge detection signal, the second blending circuit generates a second sharpening signal based on the first sharpening signal and the weight of the first sharpening signal, generates a fourth brightness signal based on the first brightness signal and the second weight of the first brightness signal, and generates a fifth brightness signal based on the third brightness signal and the weight of the third brightness signal, and the second blending circuit adds the second sharpening signal, the fourth brightness signal, and the fifth brightness signal to generate the output brightness signal.

* * * * *